(12) United States Patent
Yang et al.

(10) Patent No.: US 7,983,015 B2
(45) Date of Patent: Jul. 19, 2011

(54) ELECTROSTATIC DISCHARGE PROTECTION DEVICE FOR AN OPTICAL DISC DRIVE

(75) Inventors: Li-Li Yang, Taoyuan County (TW); Hsien-Chung Ou, Taoyuan County (TW); Chen-Fu Chang, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 622 days.

(21) Appl. No.: 12/081,420

(22) Filed: Apr. 16, 2008

(65) Prior Publication Data

US 2008/0285189 A1 Nov. 20, 2008

(30) Foreign Application Priority Data

May 16, 2007 (TW) ................................. 96117584 A

(51) Int. Cl.
*H01H 47/00* (2006.01)
(52) U.S. Cl. ...................................................... 361/220
(58) Field of Classification Search .................... 361/56, 361/91.1, 111, 212, 220; 720/650
See application file for complete search history.

(56) References Cited

U.S. PATENT DOCUMENTS

| | | | | |
|---|---|---|---|---|
| 2005/0198659 | A1* | 9/2005 | Ahn et al. | 720/650 |
| 2006/0225086 | A1* | 10/2006 | Yen | 720/650 |
| 2007/0279830 | A1* | 12/2007 | Chiou et al. | 361/220 |
| 2008/0172684 | A1* | 7/2008 | Yang et al. | 720/650 |

* cited by examiner

*Primary Examiner* — Jared J Fureman
*Assistant Examiner* — Christopher J Clark
(74) *Attorney, Agent, or Firm* — Bacon & Thomas, PLLC

(57) ABSTRACT

An electrostatic discharge protection device for an optical disc drive is provided. A rail disposed on the casing of the disc drive has an opening. A guide bar is slidable disposed on the rail. A conductive elastic plate is fixed around the opening on the rail. The elastic plate has an elastic-pressing end leaning against the guide bar through the opening, and a protrusion electrically contacting the casing. A tray supported by the guide bar to move in and out of the casing has an underside covered by a protection bottom plate. A conductive strip-shaped elastic element is fixed on the tray by a fixing screw, which fastens the protection bottom plate on the tray. As such, the elastic element is in contact with the protection bottom plate; besides, the elastic element also leans against the guide bar, so as to dissipate electrostatic discharge by the guide bar.

20 Claims, 3 Drawing Sheets

ELECTROSTATIC DISCHARGE PROTECTION DEVICE FOR AN OPTICAL DISC DRIVE

This application claims the benefit of Taiwan application Serial No. 96117584, filed May 16, 2007, the subject matter of which is incorporated herein by reference.

BACKGROUND OF THE INVENTION

1. Field of the Invention

The invention relates in general to an electrostatic discharge protection device, and more particularly to an electrostatic discharge protection device for eliminating the electrostatic discharge in an optical disc drive to protect the delicate electronic components within the optical disc drive.

2. Description of the Related Art

In the procedure of operating an optical disc drive, a user could hardly avoid touching the optical disc drive. Consequently, electrostatic discharge carried on the user's body is easily transferred to the optical disc drive. Since an optical disc drives is usually equipped with very delicate electronic components, electrostatic discharge has great opportunity causing irreversibly damage to the electronic components as long as electrostatic discharge is transferred to the delicate electronic components.

FIG. 1 is a diagram showing the inside of a conventional optical disc drive. The metallic casing 101 of the optical disc drive 100 has an empty area. Plastic rails 102 are fixed on two sides of the casing 101. Each of the plastic rails 102 has a metallic guide bar 103 to slide upon. The metallic guide bars 103 each have one end blocked by a stopper 104 on the casing 101. The other ends of the metallic guide bars 103 support a tray 105 on its two sides, enabling the tray 105 to move out of the casing 101 completely. Delicate electronic components such as a spindle motor 106 for rotating a disc and an optical pick-up unit 107 on the tray 105 are exposed along with the tray 105. A metallic protection bottom plate (not shown) is disposed beneath the tray 105 for protection. The front end of the tray 105 adjoins a panel 108. An ejection key 109 is disposed on the panel 108 for control. A flexible circuit board 110 is partially attached to the underside of the casing 101. Besides, the flexible circuit board 110 has one end connected to a main board 111 at the rear end of the casing 101, and the main board 111 is fastened to the casing 101 by a screw 112 to achieve the ground effect. The other end of the flexible circuit board 110 is connected to the rear end of the tray 105 and is electrically connected to the protection bottom plate.

When a user presses the ejection key 109 to unload a disc, the electrostatic discharge on the user's body is transferred to the protection bottom plate through the chink between the panel 108 and the ejection key 109. The flexible circuit board 110 then transfers the electrostatic discharge to the casing 101 to dissipate the electrostatic discharge. However, the circuit of the flexible circuit board 110 is small and capable of fast removing small but not massive amount of electrostatic discharge. The piling up of electrostatic discharge may cause damage to the delicate electronic components. Furthermore, as a massive amount of electrostatic discharge is transferred in the flexible circuit board 110 mainly used for transmitting signal of data, it easily interferes with the transmitted signal of data, affecting the reliability of the optical disc drive.

The metallic guide bars 103 on the two sides of the tray 105 for supporting the tray 105 are more likely to be touched by the user when replacing a disc. In addition, the guide bars 103 are isolated from the path of dissipating electrostatic discharge to ground by the plastic rails 102 and tray 105. The guide bars 103 are prone to accumulate electrostatic discharge unfavorable to the delicate electronic components within the optical disc drive. Therefore, a reliable electrostatic discharge protection device should be installed in an optical disc drive to solve the problem caused by electrostatic discharge.

SUMMARY OF THE INVENTION

It is therefore an object of the invention to provide an electrostatic discharge protection device for an optical disc drive. A conductive elastic plate is used for electrically connecting to the casing and guide bar so that electrostatic discharge on the guide bars is dissipated through the ground of the casing, preventing electrostatic discharge from damaging the delicate electronic components.

It is therefore another object of the invention to provide an electrostatic discharge protection device for an optical disc drive. A metallic elastic plate is in direct contact with the casing and leans against the slidable guide bar under its strong and everlasting elasticity, forming a larger transferring path to enhance the ability of dissipating electrostatic discharge.

The invention achieves the above-identified object by providing an electrostatic discharge protection device for an optical disc drive. The electrostatic discharge protection device includes a casing with a ground. Each side of the casing has a nonconductive rail with an opening. The rail has a braking edge disposed at the front end of the opening, a supporting bracket disposed at the real end of the opening, and a pillar disposed near the supporting bracket. A conductive guide bar is slidable disposed on the rail. A conductive elastic plate is fixed on the supporting bracket around the opening. The elastic plate has one side bent downward to form an extension portion that has a protrusion and a fixing hole. The protrusion electrically contacts to the casing and the pillar of the supporting bracket inserts into the fixing hole. The elastic plate has the other side bent downward to form a positioning edge to hold the supporting bracket. The elastic plate also has an elastic-pressing end leaning against the guide bar for forming an electrical connection with the guide bar. The farthest side of the elastic-pressing end has a restriction portion pressed by the braking edge.

The invention achieves the above-identified object by providing an electrostatic discharge protection device for an optical disc drive. The electrostatic discharge protection device includes a casing with a ground. A nonconductive rail with an opening is disposed on one side of the casing. A conductive guide bar is slidable disposed on the rail. A conductive elastic plate is fixed on the rail around the opening. The elastic plate has an elastic-pressing end leaning against the guide bar through the opening and a protrusion electrically contacting to the casing. A tray supported by the guide bar to move in and out of the casing has an underside covered by a conductive protection bottom plate. A conductive strip-shaped elastic element is fixed on the tray by a fixing screw, which fastens the protection bottom plate on the tray. As such, one end of the conductive strip-shaped elastic element is in contact with the protection bottom plate. Besides, the other end of the conductive strip-shaped elastic element also leans against the guide bar, so as to electrically connect the protection bottom plate to the guide bar.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
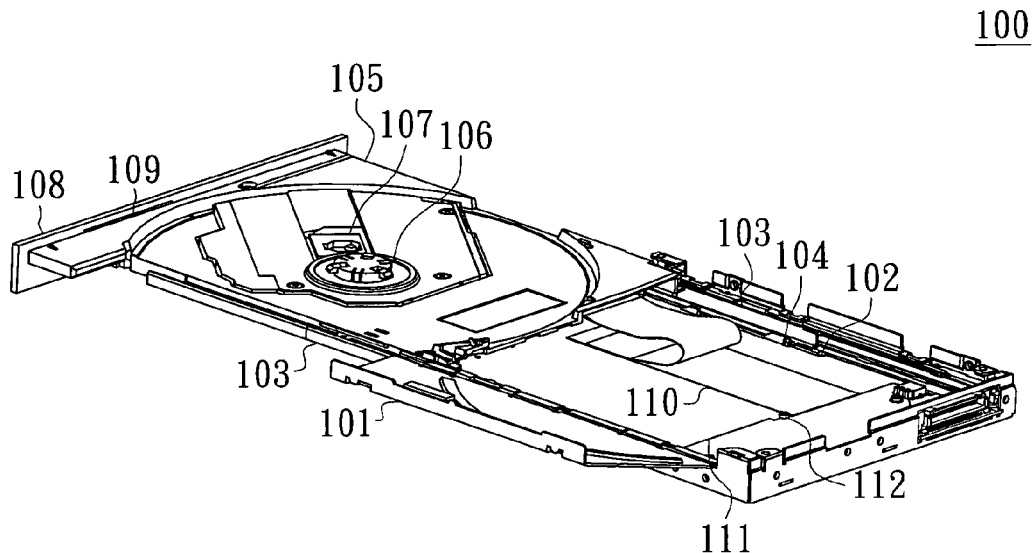
FIG. 1 is a diagram showing the inside of a conventional optical disc drive.
Figure 2:
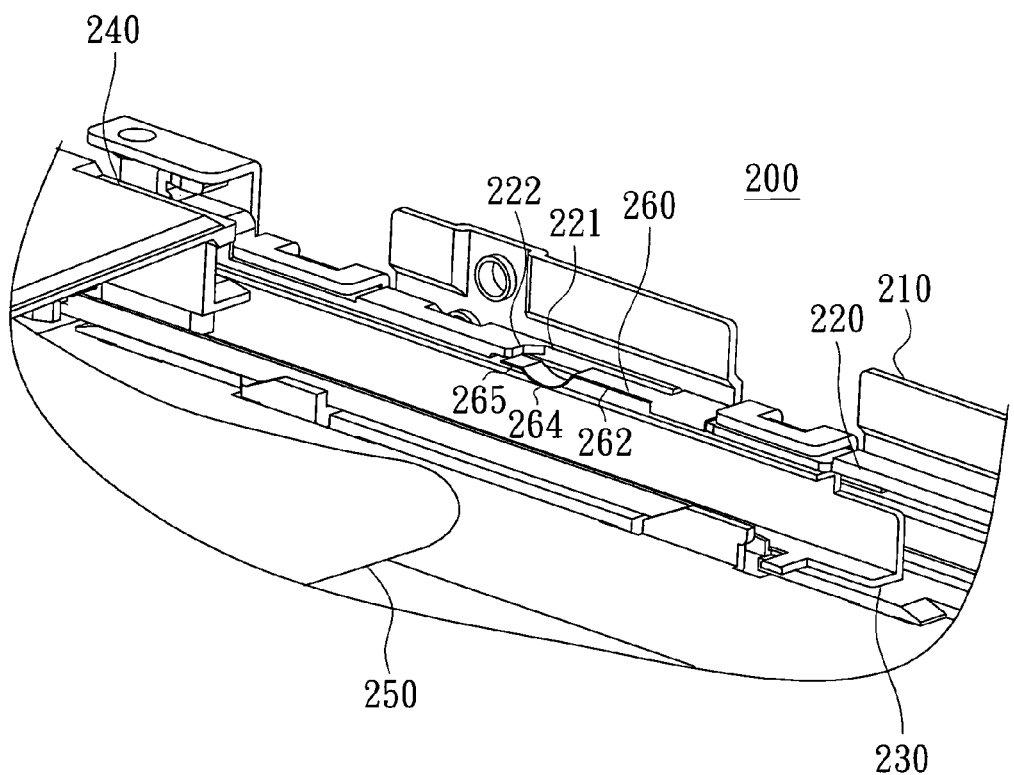
FIG. 2 is a diagram showing an optical disc drive making use of an electrostatic discharge protection device according to an embodiment of the invention.

FIG. 2 is a diagram showing an optical disc drive making use of an electrostatic discharge protection device according to an embodiment of the invention. The optical disc drive 200 includes a casing 210, rails 220, guide bars 230, a tray 240, a flexible circuit board 250, and an elastic plate 260. The casing 210 is formed from a conductive material such as metal. The casing 210 is partially bent to fix the rails 220 on the two inner sides of the casing 210. The rails 220 are formed from a nonconductive material such as plastics for reducing the noise from sliding. Each of the guide bars 230 is disposed within one of the rails 220 and is formed from metal. By the strength of the guide bars 230, the guide bars 230 support the two sides of the tray 240 so that the tray 240 moves in or out of the casing 210. The flexible circuit board 250 is connected to the tray 240 and moves with the tray 240 for the signal transmission of data.

Figure 3:
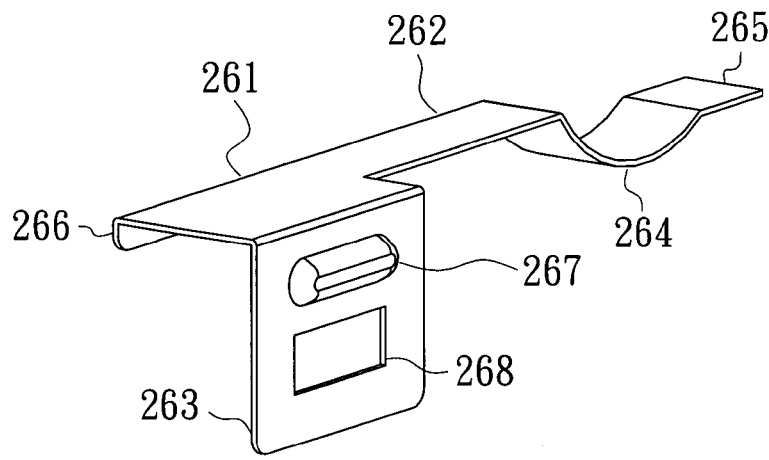
FIG. 3 is a diagram showing the structure of the elastic plate.

Each of the rails 220 has an opening 221. The elastic plate 260 is fixed around the opening 221. FIG. 3 is a diagram showing the structure of the elastic plate 260. The elastic plate 260 includes a main body 261, an elastic-pressing end 262 and an extension portion 263. The main body 261 has a smooth surface. The elastic-pressing end 262 formed as a strip-shaped sheet extends from the main body 261 along a direction substantially parallel to the smooth surface of the main body 261. The elastic-pressing end 262 has a curve-shaped touching foot 264 bent downward. A flat restriction portion 265 is on the farthest side of the elastic-pressing end 262 relative to the main body 261. One side of the main body 261 is bent downward slightly to form a positioning edge 266. The extension portion 263 is vertically disposed on the other side of the main body 261 and has a protrusion 267 and a fixing hole 268. The protrusion 267 is a conductor that is electrically connected to the elastic plate 260 and can be directly formed from the elastic plate 260 by punching. The fixing hole 268 is a through and rectangular hole directly formed on the elastic plate.

Figure 4:
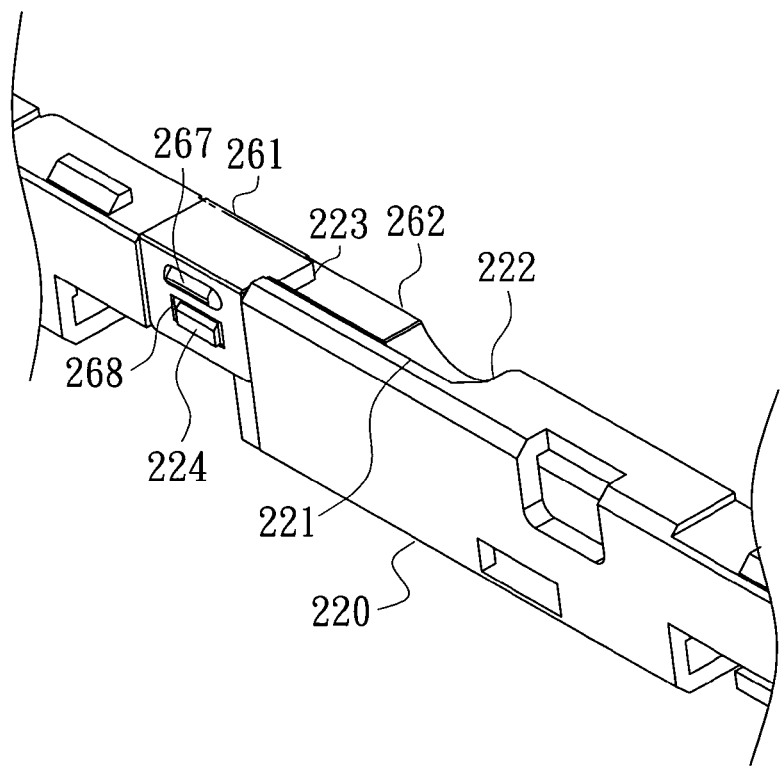
FIG. 4 is a diagram partially showing the reverse side of the assembly of the rail and the elastic plate.

FIG. 4 is a diagram partially showing the reverse side of the assembly of the rail 220 and the elastic plate 260. The rail 220 is bar-shaped, and the opening 221 is located at the upper end of the rail 220. The rail 220 has a braking edge 222 disposed at the front end of the opening 221, wherein an inner groove is beneath the braking edge 222. The rail 220 further has a supporting bracket 223 disposed at the rear end of the opening 221. Moreover, a pillar 224 is disposed on the reverse side of the rail 220 corresponding to the supporting bracket 223. The pillar 224 is rectangular and has a proper size to match with the fixing hole 268 of the elastic plate 260. When assembling the elastic plate 260, the main body 261 of the elastic plate 260 is disposed on the supporting bracket 223 to insert the pillar 224 into the fixing hole 268 and to hold the supporting bracket 223 by the positioning edge 266 (shown in FIG. 3).

The elastic plate 260 is then fixed on the rail 220 by its inherent elasticity. In addition, the pillar 224 can be glued to the fixing hole 268 for firmly fixing the elastic plate 260.

As shown in FIG. 2, after the elastic plate 260 is fixed on the rail 220, its elastic-pressing end 262 is positioned within the opening 221 and the restriction portion 265 of the elastic-pressing end 262 is inserted into the inner groove beneath the braking edge 222, so that the restriction portion 265 is pressed by the braking edge 222, enabling the curve-shaped touching foot 264 of the elastic plate 260 to properly lean against the guide bar 230 to electrically connect to the guide bar 230 as well as to permit the guide bar 230 to move within the rail 220. Afterwards, the rail 220 is fixed to one side of the casing 210 to make the protrusion 267 on the reverse side of the rail 220 to contact with the casing 210, so as to electrically connect the rail 220 with the casing 210.

After assembled, the electrostatic discharge on the guide bar 230 is sequentially transferred through the curve-shaped touching foot 264, the main body 261 and the protrusion 267 of the elastic plate 260 to the ground of the casing 210, achieving the object of dissipating electrostatic discharge by the electrostatic discharge protection device according to the embodiment of the invention. The electrostatic discharge protection device according to the embodiment of the invention employs the elastic plate 260 with high strength and elasticity to lean against the slidable guide bar 230, and uses the braking edge 222 to prevent the touching foot 264 from coming off the guide bar 230 and to maintain the proper contact between the elastic plate 260 and the guide bar 230. In addition, the protrusion 267 and the casing 210 are leant against each other. Therefore, a reliable path for transferring electrostatic discharge to ground and a large conductibility are provided, so as to enhance the capacity of dissipating the electrostatic discharge on the guide bar 230 as well as to protect the delicate electronic components from the harm of electrostatic discharge.

Figure 5:
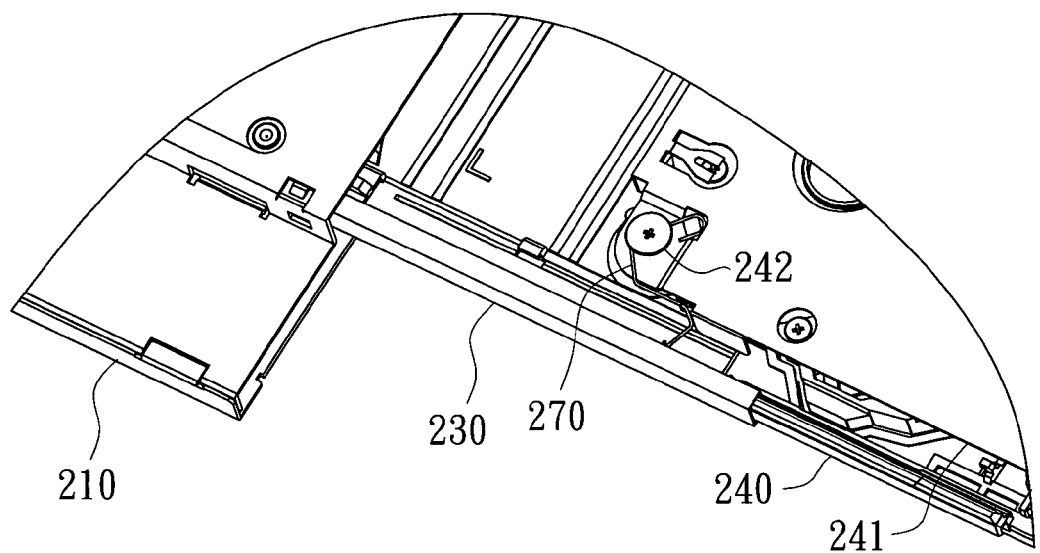
FIG. 5 is a diagram partially showing the reverse side of the optical disc drive.

FIG. 5 is a diagram partially showing the reverse side of the optical disc drive 200. The tray 240 of the optical disc drive 200 carried upon the guide bar 230 is outside the casing 210. A conductive metallic protection bottom plate 241 covers the reverse side of the tray 240. A fixing screw 242 at the rear corner near the guide bar 230 is used for fastening a strip-shaped conductive elastic element 270 and the protection bottom plate 241 on the tray 240. The strip-shaped elastic element 270 has one end leaning against the guide bar 230 for allowing the guide bar 230 to slide and the other end in contact with the protection bottom plate 241 to form an electrical connection.

When the user presses an ejection key (not shown) of the optical disc drive. 200 to unload a disc, electrostatic discharge on the user's body is transferred to the protection bottom plate 241 through the chink between a panel and the ejection key of the optical disc drive 200, and then is transferred to the guide bar 230 through the elastic element 270. As shown in FIG. 2, electrostatic discharge on the guide bar 230 is transferred to the ground of the casing 210 by the elastic plate 260 and then is dissipated, forming another path for transferring electrostatic discharge to ground by the electrostatic discharge protection device according to the embodiment of the invention.

The electrostatic discharge protection device for an optical disc drive according to the embodiment of the invention makes use of conductive elastic element and elastic plate to electrically connect to the protection bottom plate, the guide rail and the casing, so that the electrostatic discharge is transferred to ground by the guide rail without passing through the flexible circuit board, avoiding the electrostatic discharge interfering with the signal transmission of data. Additionally, the path by means of the guide rail to dissipate the electrostatic discharge has greater capacity than the path through the flexible circuit board, being able to dissipate a massive amount of electrostatic discharge efficiently. Although the metallic guide rails on the two sides of the casing are isolated by the plastic rails and tray and easily to be touched when operating, the accumulated electrostatic discharge on the guide rails still are transferred to ground due to the reason that the guide rails are part of the path for transferring electrostatic discharge. Accordingly, the possibility of damaging the delicate electronic components in the optical disc drive is reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electrostatic discharge protection device for an optical disc drive, comprising:
    a casing with a ground;
    at least a rail disposed on one side of the casing, wherein the rail is formed from a nonconductive material;
    a guide bar slidably disposed on the rail, wherein the guide bar is formed from a conductive material; and
    an elastic plate having one end in contact with the casing and the other end leaning against the guide bar to make an electrical connection between the casing and the guide bar.

2. The electrostatic discharge protection device according to claim 1, wherein two rails are disposed on the two inner sides of the casing, each of the two rails is equipped with the guide bar and the elastic plate.

3. The electrostatic discharge protection device according to claim 1, wherein the rail has an opening, the elastic plate is disposed around the opening on the rail.

4. The electrostatic discharge protection device according to claim 3, wherein the elastic plate comprises a main body and an elastic-pressing end, the elastic-pressing end extends from one side of the main body and leans against the guide bar through the opening.

5. The electrostatic discharge protection device according to claim 4, wherein the farthest side of the elastic-pressing end relative to the main body is a restriction portion, the rail has a braking edge disposed at the front end of the opening for pressing the restriction portion.

6. The electrostatic discharge protection device according to claim 5, wherein the rail has a supporting bracket disposed at the rear end of the opening for fixing the elastic plate.

7. The electrostatic discharge protection device according to claim 5, wherein the elastic-pressing end has a curve-shaped touching foot bent downward near the farthest side of the elastic-pressing end, and the curve-shaped touching foot leans against the guide bar.

8. The electrostatic discharge protection device according to claim 6, wherein the elastic plate further comprises an extension portion vertically disposed on one side of the main body, the extension portion has a fixing hole, and the rail has a pillar disposed on its reverse side corresponding to the supporting bracket for inserting into the fixing hole.

9. The electrostatic discharge protection device according to claim 8, wherein the fixing hole is a through hole that is directly formed on the elastic plate.

10. The electrostatic discharge protection device according to claim 8, wherein the extension portion further has a protrusion.

11. The electrostatic discharge protection device according to claim 10, wherein the protrusion is a conductor electrically connected to the elastic plate.

12. The electrostatic discharge protection device according to claim 10, wherein the protrusion and the elastic plate are integrated as a whole.

13. The electrostatic discharge protection device according to claim 8, wherein the other side of the main body is bent downward slightly to form a positioning edge for holding the supporting bracket.

14. An electrostatic discharge protection device for an optical disc drive, comprising:
    a casing with a ground;
    a rail disposed on one side of the casing, wherein the rail is formed from a nonconductive material;
    a guide bar slidably disposed on the rail, wherein the guide bar is formed from a conductive material;
    an elastic plate having one end in contact with the casing and the other end leaning against the guide bar for electrically connecting the casing and the guide bar;
    a tray supported by the guide bar to move in and out of the casing, wherein the underside of the tray is covered by a conductive protection bottom plate; and
    a conductive elastic element fixed on the tray, having one end electrically connected to the protection bottom plate and the other end leaning against the guide bar for electrically connecting the protection bottom plate and the guide bar.

15. The electrostatic discharge protection device according to claim 14, wherein the rail has an opening, the elastic plate is disposed around the opening on the rail and has a main body and an elastic-pressing end, the elastic-pressing end extends from one side of the main body and leans against the guide bar through the opening.

16. The electrostatic discharge protection device according to claim 15, wherein the farthest side of the elastic-pressing end relative to the main body is a restriction portion, the rail has a braking edge disposed at the front end of the opening for pressing the restriction portion.

17. The electrostatic discharge protection device according to claim 15, wherein the elastic plate further comprises an extension portion vertically disposed on one side of the main body, the extension portion has a fixing hole, and the rail has a pillar for inserting into the fixing hole.

18. The electrostatic discharge protection device according to claim 17, wherein the extension portion further has a protrusion, and the protrusion is a conductor electrically connected to the elastic plate.

19. The electrostatic discharge protection device according to claim 14, wherein a fixing screw is used for fastening the conductive elastic element and the protection bottom plate on the tray.

20. The electrostatic discharge protection device according to claim 14, wherein the conductive elastic element is strip-shaped.

* * * * *